United States Patent [19]

Ellis et al.

[11] Patent Number: 4,608,907
[45] Date of Patent: Sep. 2, 1986

[54] ROTARY LAUNCHER AND HYDRAULIC EJECTOR SYSTEM

[75] Inventors: Larry G. Ellis; Gabor L. Radi, both of Jamestown, N. Dak.

[73] Assignee: Western Gear Corporation, Jamestown, N. Dak.

[21] Appl. No.: 489,644

[22] Filed: Apr. 28, 1983

[51] Int. Cl.$^4$ .............. F41F 3/06; B64D 1/04
[52] U.S. Cl. .................. 89/1.815; 89/1.51; 244/137 A
[58] Field of Search ............ 89/1.5 E, 1.5 F, 1.5 G, 89/1.5 H, 1.5 R, 1.8, 1.803, 1.804, 1.815; 244/137 A, 137 R

[56] References Cited

U.S. PATENT DOCUMENTS

| | | | |
|---|---|---|---|
| 2,826,120 | 3/1958 | Lang et al. | 89/1.803 |
| 2,905,055 | 9/1959 | Camp et al. | 89/1.5 R |
| 2,971,731 | 2/1961 | Graw | 244/137 A |
| 3,295,410 | 1/1967 | Edwards | 89/1.5 R |
| 3,756,545 | 9/1973 | Coutin | 244/137 R |
| 3,936,019 | 2/1976 | Craigie | 244/137 R |
| 3,960,051 | 6/1976 | Hunt | 89/1.8 |
| 3,974,990 | 8/1976 | Holt et al. | 244/137 R |
| 4,040,334 | 8/1977 | Smethers | 89/1.804 |
| 4,088,287 | 5/1978 | Hasquenoph et al. | 244/137 A |
| 4,095,762 | 6/1978 | Holt | 89/1.5 F |
| 4,187,761 | 2/1980 | Holt et al. | 89/1.5 E X |
| 4,208,949 | 6/1980 | Boilsen | 89/1.815 X |
| 4,246,472 | 1/1981 | Sun et al. | 89/1.5 E X |
| 4,256,012 | 3/1981 | Cowort et al. | 89/1.5 R X |
| 4,257,639 | 3/1981 | Stock | 89/1.5 G X |
| 4,318,328 | 3/1982 | Rona | 89/1.5 H X |
| 4,333,384 | 6/1982 | Arnold | 89/1.803 |
| 4,399,968 | 8/1983 | Stock et al. | 89/1.5 F X |
| 4,409,880 | 10/1983 | Fetterly | 89/1.804 |

Primary Examiner—David H. Brown

[57] ABSTRACT

A rotary launcher for airborne launching of stores by use of a hydraulic ejector system. The ejector system is carried in stationary relationship to the launch position of a rotary store carrier of the launcher and is mounted in stationary relationship to a non-rotary axle member of the rotary launcher upon which the rotary store carrier is rotatably carried.

14 Claims, 4 Drawing Figures

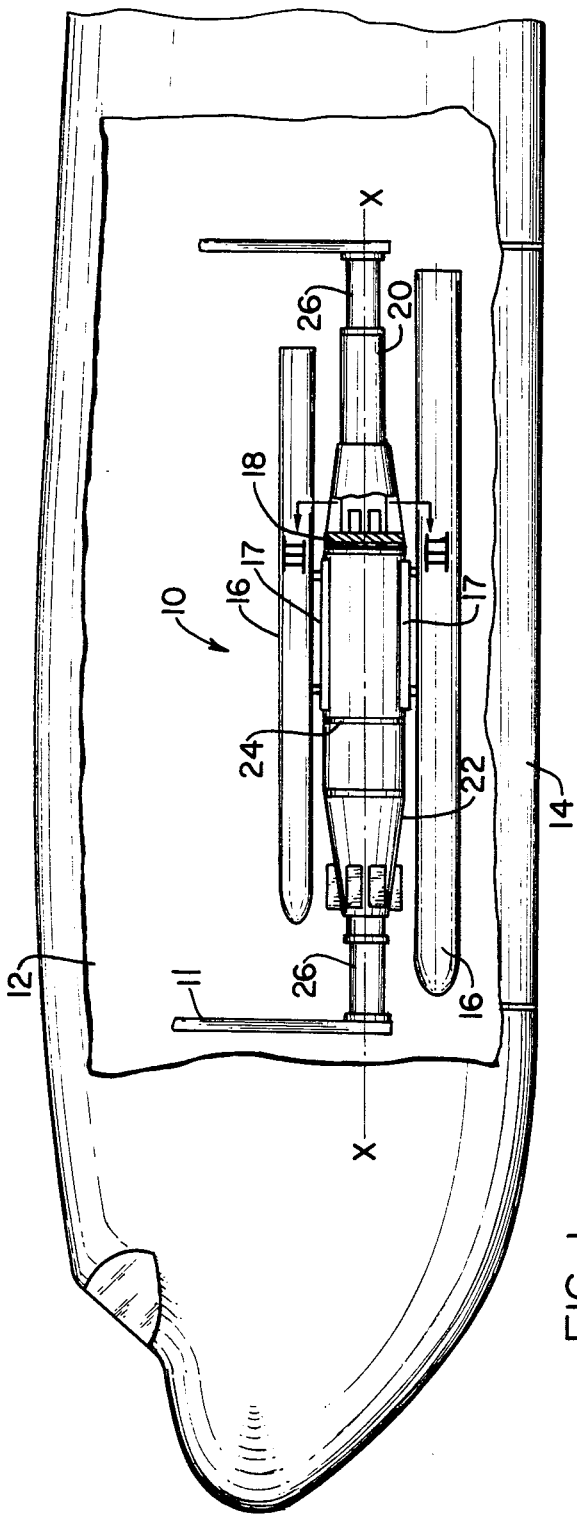
FIG. 1
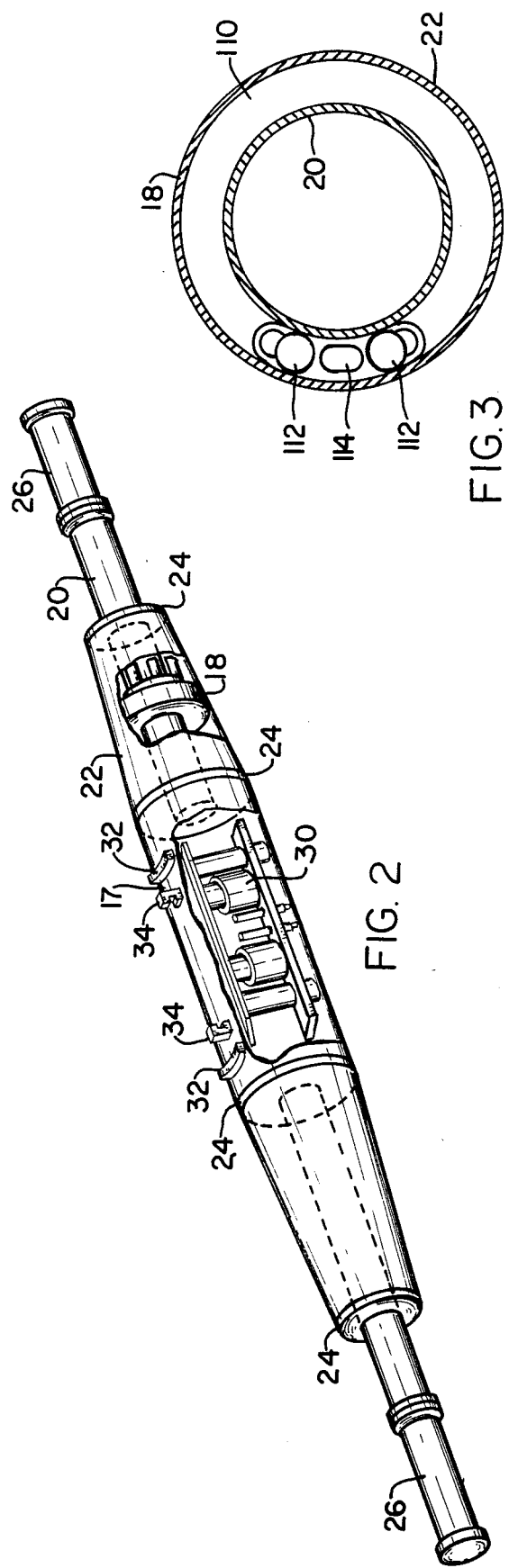
FIG. 3
FIG. 2

ROTARY LAUNCHER AND HYDRAULIC EJECTOR SYSTEM

BACKGROUND OF THE INVENTION

It is well known in the airborne launching of such devices as missiles, bombs or weather monitors to utilize an aircraft equipped with a launcher that includes a rotary carrier which is adapted to carry a number of such devices or "stores" at circumferentially spaced locations. The rotary carrier is able to sequentially index the stores into launch position for launching thereof from the aircraft. Typically, such launchers retain the stores by means of latch sets which are located about the circumference of the rotary carrier with each set being individually operable by suitable controls to release the store secured thereby. Prior airborne launch systems also have commonly employed ejection apparatus for ejecting a store clear of the aircraft upon release of the store from its carrier. The prior art is replete with examples of such airborne launching systems, the following U.S. Pat. Nos. being exemplary: 2,826,120, 2,905,055, 2,971,731, 3,295,410, 3,756,545, 3,936,019, 3,960,051, 3,974,990, 4,040,334, 4,088,287, 4,187,761 and 4,333,384.

In many prior rotary launch systems an ejector is provided for each store carrier location on the rotary carrier and all such ejectors are mounted on the rotary carrier for rotation therewith. This has resulted in unduly complex ejection systems and the considerable duplication of hardware resulting from use of a number of identical ejectors.

In other prior rotary launch systems a rotary store carrier is rotationally affixed to a rotary axle for rotation therewith. The rotating axle of such prior rotary carrierswas required to be of sufficient structural integrity to support the loads applied thereto in any rotary position. The applied loads would consist generally of the combined weight of the rotary carrier and the stores carried thereby acting in a vertical plane, and the torque load of a partially empty rotary carrier in which those store locations to one side of the central vertical plane and approaching the 6 o'clock (launch) position carry stores whereas the store locations on the opposite side of the central vertical plane are empty. To support these loads, the structural strength of prior rotating axles in planes other than the vertical plane has far exceeded the strength required by the expected loading in such other planes in order to assure that the axle would accommodate the loads applied in the vertical plane as the axle rotates with the rotary carrier. Prior rotary carriers thus have been considerably over-designed and unduly wasteful of the potential aircraft payload and cargo capacity. The above-mentioned duplication of ejector system hardware has further aggravated the waste of potential aircraft payload.

Prior art of ejector systems for both rotary and other airborne launch systems have included pyrotechnic type systems which employ pyrotechnic cartridges to produce, upon ignition thereof, a rapidly expanding volume of hot gases that is channeled to an ejector device. The ejector device contacts a store to forcefully eject the store clear of the aircraft. Such prior ejector systems exhibit considerable sensitivity to the quantity, composition and quality of the explosive load in the cartridge, are subject to post-ignition residue accumulation in the ejector system which necessitates frequent cleaning and maintenance, and are limited to a single shot operating cycle for a given mission. These undesirable characteristics of pyrotechnic ejectors are manifested in the need for on-the-ground rearming and servicing of each ejector to be used during a subsequent mission, and the inability of such ejectors to accommodate inflight repair, replacement or rearming.

A related undesirable aspect of pyrotechnic ejectors is the inability to disarm a loaded ejector by any means other than ejection of the store. Thus, an aircraft carrying unlaunched stores would have to land with the pyrotechnic ejectors of the unlaunched stores still armed. This represents a hazardous and potentially catastrophic mode of operation in the event of certain ejector malfunctions or inadvertent ejector operation in that many prior pyrotechnic ejectors offer no assured safe mode of inflight failure or inactivation. Other prior ejector systems, mechanical spring bias ejectors for example, also have not been adapted for inflight maintenance, repair, replacement, disarming or rearming.

BRIEF SUMMARY OF THE INVENTION

The present invention contemplates an improved rotary launch system for airborne launching of stores and an improved ejector system therefor. According to one aspect of the invention a rotary launch system incorporates a rotary store carrier structure which is rotatably carried upon a non-rotary axle structure. Store-retaining latch sets are distributed circumferentially of the rotary carrier to secure stores thereto. The rotary carrier is rotatable to sequentially move the stores carried thereby into the launch position for sequential launching thereof. The non-rotary axle of the rotary carrier is of tubular or other such suitable configuration as to permit housing therein of an ejector system which is repetitively operable to eject the stores as they are sequentially moved to the launch position.

The ejector system preferably incorporates a single set of ejectors which are operable in concert with the latch release actuators of the store carrier latches located in the launch position to eject the store located in the launch position. The ejector system may be rearmed in flight to perform repeated ejections. The use of a single ejector system and the optimized carrier and axle design both help to maxmize the available aircraft payload.

The present invention further contemplates a hydraulic ejector system preferably utilizing hydraulic fluid force transmission and electrically powered fluid flow control valving to provide an ejector offering more favorable sensitivity, easier maintenance and improved safety features over prior pyrotechnic and mechanical spring bias ejectors. The hydraulic ejector system of this invention is recyclable in flight and thus is able to provide a series of ejection operations for ejecting a number of stores in sequence without need of repeated onground rearming or other service. The hydraulic ejector system also permits inflight disarming thereof by relief of the system hydraulic fluid pressure to assure safe return of the aircraft with unlaunched stores and to preclude inadvertent ejector operation.

The hydraulic ejector system also provides clean operation, does not require repeated frequent maintenance as a result of normal use and may be programmed in flight to tailor store ejection velocity and pitch attitude according to prevailing relevent conditions.

Other advantages of the hydraulic ejection system include reduced parts and maintenance requirements by virtue of the multiple shot capability which eliminates duplication of ejector system components for each store retaining position on the rotary carrier and resultant ejector system weight reductions and corresponding aircraft payload increases.

It is therefore one primary object of this invention to provide a rotary launcher having a store carrier mounted for rotation with respect to a non-rotary central axle member.

Another primary object of the invention is to provide a rotary launcher with multiple store carrying capacity and a single, ejector means which is recyclable for the ejection in a predetermined sequence of a number of stores.

Another more specific object of the invention is to provide a rotary launcher having a rotary carriage with multiple store carrying capacity mounted for rotation about a non-rotary central support member within which is housed a common ejector system.

Another primary object of the invention is to provide a hydraulic ejector system to be used in ejecting stores from an aircraft for airborne launching thereof.

Yet another object of the invention is to provide a hydraulic ejector system which is recyclable to sequentially eject a plurality of stores from an aircraft for airborne launching thereof.

Still another object of the invention is to provide a hydraulic ejector system which is controllable to alter store ejection velocity and/or pitch attitude by control of hydraulic fluid flow rate in the ejection system.

These and other objects and advantages of the invention will become more readily apparent upon consideration of the following description and the accompanying figures, in which:

FIG. 1 is a fragmentary schematic side elevation of an aircraft equipped with a rotary launching system of the present invention.

FIG. 2 is a perspective view of a rotary launching apparatus of the present invention partially broken away to show the ejector system associated therewith and with the central portion of the stationary shaft being omitted.

FIG. 3 is a fragmentary sectioned view taken on line III—III of FIG. 1.

Figure 4:
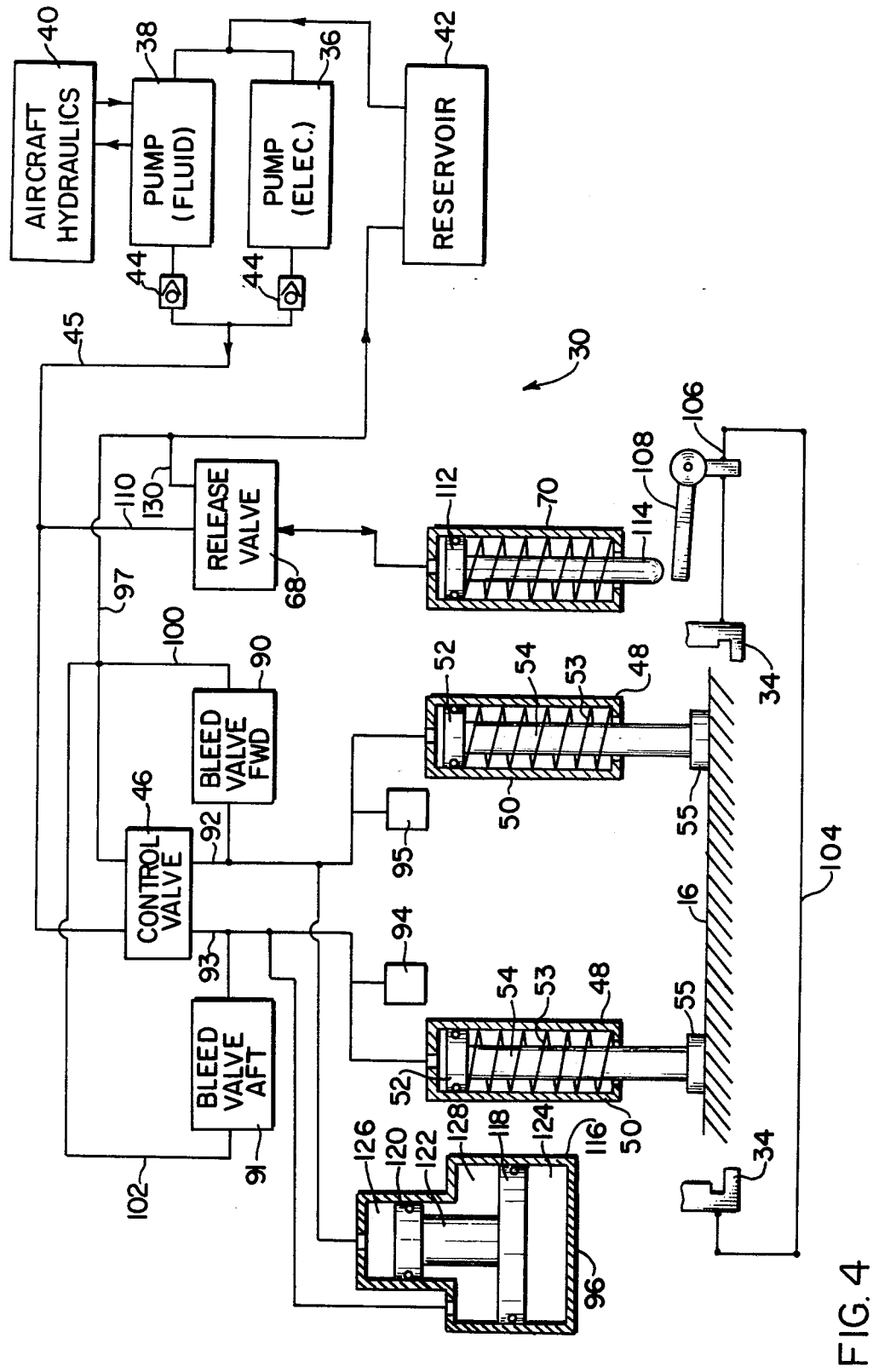
FIG. 4 is a schematic view of the hydraulic ejector system of this invention.

Generally indicated at 10 in FIG. 1 is a rotary launcher according to one presently preferred embodiment of the invention and shown mounted on suitable air frame structural members 11 within an aircraft 12 adjacent to bomb bay doors 14 which may be opened for launching of a store 16 from launcher 10. The launcher 10 preferably is able to secure a number of stores 16 by means of carrier latch sets 17 spaced circumferentially thereabout.

Launcher 10 includes a rotary drive means 18 for rotation of an elongated store carrier 22 about an axis of rotation X—X for rotating the stores carried thereby into the launch position, often called the six o'clock position, whereat the store typically is positioned directly beneath the axis of rotation X—X of the rotary launcher 10. Launcher 10 further includes an elongated non-rotatable axle member 20 of tubular or other suitable cross sectional form. The rotatable store carrier 22 encompasses axle member 20 and is rotatable thereabout by the rotary power drive means 18.

To provide for relative rotation between axle 20 and carrier 22 there are provided a plurality of suitable rotary bearing interfaces 24 spaced longitudinally of carrier 22, spherical roller or ball bearing assemblies for example. The bearing assemblies 24 should permit free relative rotation between axle member 20 and store carrier 22 throughout the range of all expected bending deflections of axle 20 without binding or incurring strain.

Power drive 18 includes a suitable gear train 110 such as a planetary set carried in an annular space radially between axle 20 and rotary carrier 22. A hydraulic motor or motors 112 power gear train 110 to rotate carrier 22 with respect to axle 20. Each motor 112 preferable includes an integral brake (not shown) to retain the selected rotary position to which carrier 22 has been rotated by motors 112. An encoder 114 monitors the position of gear train 110 relative to the launch position to provide a carrier position signal which permits accurate rotary positioning of the carrier 22 thereby assuring proper alignment of the selected store in the launch position.

Axle 20 may include end extensions 26 of selected length for use in adapting the launcher 10 to a variety of store sizes and aircraft configurations to thereby extend its range of utility. For example, a larger store 16 requiring the use of extensions 26 is shown in the lower or "6-o'clock" position in FIG. 1. A smaller store 16 which would not require the extensions 26 is shown atop the rotary launcher 10.

Axle 20 houses a store ejector system 30 (FIG. 2) which is selectively operable to eject a store located in the launch position through the open doors 14 and clear of the aircraft 12. Accordingly, each carrier-latch set 17, when located in the launch position, is cooperable with ejector system 30 for coordinated release and ejection of the store 16 carried thereby. Each carrier-latch set 17 thus includes a pair of suitably formed saddle members 32 upon which a store 16 is secured and retained by hook latches 34 which latch onto cooperating latch receivers (not shown) on the store 16 to secure the store with respect to rotary carrier 22 in saddle members 32. The ejector system 30 is cooperable with the carrier-latch set 17 which is located in the launch position for coordinated release of latches 34 and ejection of the store 16 from saddle members 32 in a manner to be described hereinbelow.

Referring to FIG. 4, the hydraulic ejector system 30 is powered by an electrical pump 36 or a fluid powered pump 38 driven by aircraft hydraulics 40. Hydraulic fluid is drawn from a reservoir 42 by pump 36 and/or 38 and transmitted to a control valve 46 via a pressure fluid conduit 45.

The inlet of control valve 46 is connected to pressure fluid conduit 45 and an outlet is connected to a return conduit 97. Two common output ports of valve 46 are connected to conduits 92 and 93. In a neutral or center position of valve 46 all ports are closed. For a charge cycle, pressure fluid from conduit 45 is split between conduits 92 and 93. For the retract cycle the pressure port of valve 46 is closed and fluid flows from conduits 92 and 93 through valve 46 to return conduit 97.

Connected to outlet conduits 92, 93 are, respectively, the inlets of forward and aft bleed valves 90,91, forward and aft pressure transducers 95,94, and the inlets of forward and aft ejector cylinder assemblies 48.

The forward and aft bleed valves, 90,91 are on/off valves including a flow control device to permit pressure bleed off from the respective conduits 92,93 to return conduit 97 via bleed off conduits 100, 102, respectively. Flow through bleed valves 90,91 is always from conduits 92,93 to return conduit 97.

Pressure transducers 94,95 monitor the pressure buildup in the forward and aft sides of the ejector system and in response they provide system controls to achieve the correct ejection pressure. Also connected to fluid conduits 92,93 is an intensifier assembly 96. Intensifier 96 and its incorporation in ejector system 30 is the invention of William Carter and not that of the inventor herein, whose sole source of knowledge concerning intensifier 96 is William Carter. Intensifier 96 and its operation in ejector system 30 is disclosed hereinbelow solely for purposes of compliance with best mode disclosure requirements of the patent statutes.

Intensifier assembly 96 includes a housing 116 within which two pistons 118,120 are mechanically connected together by a rod 122 to move axially in unison under hydraulic fluid pressure to compress a suitable compressable medium, $N_2$ gas for example, in space 124 beneath the piston 118 to store energy. The working volumes 126,128 above pistons 120,118, respectively, are equal and are designed to provide equal fluid flow rate to the ejector assemblies 48 for full and uniform travel of pistons 52. That is, for a given upward stroke of pistons 118 and 120 under the impetus of the compressed gas in volume 124, the volumes swept by pistons 118 and 120 are equal.

Each of forward and aft assemblies, 48 includes a cylinder 50 within which a piston 52 is axially movable under the impetus of the pressure fluid supplied thereto in a manner to be described hereinbelow. An elongated stem portion 54 of piston 52 projects from one end of cylinder 50 and has an outermost end 55 thereof which is suitably formed to be maintained in contact with the body of a store 16 located in the launch position. Thus, when pressurized hydraulic fluid is supplied via conduits 93 and 92 to move pistons 52 through an ejection stroke, the store 16 is ejected from the retained position thereof. A return or retract spring 53 encompasses each stem portion 54.

Ejection system 30 cooperates with a mechanical release means to release hooks 34 from store 16 through the action of a mechanical linkage train 104 in which a cam actuated release linkage element or elements 106 is actuated by a pivoted release lever 108. A release portion of hydraulic ejector system 30 includes a release valve 68 which communicates via a conduit 110 with pressure conduit 45 to deliver pressure fluid via conduit 110 and valve 68 to a release cylinder assembly 70. A piston 112 is reciprocable within cylinder 70 under the impetus of such pressure fluid flow and a projecting stem 114 of piston 112 is positioned to actuate lever 108 and thereby release hooks 34 upon pressure fluid actuated extension of cylinder assembly 70.

The ejector cylinder assembly 70 is part of the ejector system 30 and thus is stationary. The release lever 108 is part of one carrier latch set 17, of which there are several positioned circumferentially about rotary carrier 22. When a given carrier latch set 17 is in the launch or eject position to eject a store, the respective release lever 108 is positioned to be actuated by cylinder assembly 70. Thus upon actuation of the release lever, the camming mechanism is actuated to move the release linkages and, in turn, open the hooks 34.

The operational sequence of the ejector system 30 is as follows:

When the store 16 is at the 6 o'clock position, pumps 36,38 are started and the pressure conduit 45 carries hydraulic pressure fluid to the control valve 46, and the release valve 68. A signal is supplied to control valve 46 to precharge the ejectors. Thus, control valve 46 shifts and pressurized fluid is directed via conduits 92 and 93 to intensifier chambers 126 and 128. The ejector pistons 52 extend downwardly under the fluid pressure impetus until the end 55 of each contacts the store 16 in the launch position. Pressure builds up in intensifier chamber 124 (as the gas volume is compressing) and in conduits 92,93 until pressure transducers 94 and 95 signal that the system is at the correct pressure and close control valve 46.

When the store 16 is to be launched, a signal is sent to release valve 68 and it shifts to the open position to permit fluid flow to enter the release cylinder 70. Release cylinder piston 112 moves downwardly to contact and move release lever 108 and thus unlock the hooks 34. As the hooks 34 open the ejector pistons 52 extend forcefully under the impetus of hydraulic fluid pressure and the pressure of the compressed gas in volume 124. When the ejector pistons 52 are fully extended the control valve 46 is shifted to the return position and hydraulic fluid in cylinders 50 flows back to the reservoir 42 via conduit 97 under the impetus of retraction springs 53. Simultaneously, release valve 68 is also shifted to the return position and fluid in release cylinder assembly 70 returns to the reservoir 42 via a connection 130 to return conduit 97.

For ejector force control, when the precharge cycle is completed, the bleed valves 90,91 are opened and pressure transducers 94,95 are monitored until the required system pressure is established. Then the bleed off valves 90,91 are closed. During this bleed off pressure reduction the gas in space 124 expands and drives the intensifier pistons 118,120 upward until the pressures equalize. In this mode of operation, when the store 16 is released, the ejector pistons 52 will not move through a full stroke due to the reduced volume of hydraulic fluid in intensifier 96.

For store pitch control (e.g. nose down attitude), the sequence for precharge is first completed. Then when the release valve 68 is activated for store release, the aft bleed valve 91 is also opened. Thus, during the ejection stroke the aft ejector piston 52 will travel slower than the forward ejector piston as a volume of fluid in conduit 93 will flow via bleed valve 91 to return conduit 97. During the subsequent retract cycle the bleed valve 91 will be deactivated.

According to the description hereinabove the present invention provides an improved rotary launcher for airborne launching of stores from an aircraft and an improved ejection system therefor. A presently preferred embodiment of the invention having been described, it is to be understood that numerous alternative and modified embodiments have been envisioned and anticipated by the inventor. Accordingly, the invention is intended to be construed as broadly as permitted by the scope of the claims appended hereto.

We claim:

1. An airborne stores launcher adapted for use in an aircraft comprising:
    an elongated axle member adapted to be carried in stationary relationship within the fuselage of an aircraft;
    a formed, generally tubular stores carrier member axially encompassing an axial extent of said axle member and rotatable about a longitudinal axis of said axle member;

said carrier member having a plurality of circumferentially spaced store retaining means each of which is adapted to releasably support an individual one of a plurality of circumferentially spaced stores extending longitudinally of said carrier member;

a selectively actuatable drive means carried by at least one of said members to selectively rotate said carrier member about said axis and locate a selected one of said store retaining means in a launching position, and selectively actuatable ejector means carried by said axle member cooperable only with a store retaining means in said launching position to release a store supported thereby and to eject such released store from the aircraft.

2. An airborne stores launcher as defined in claim 1 wherein said ejector means comprises a hydraulic system.

3. An airborne stores launcher as defined in claim 1 wherein said ejector means includes a hydraulic system having separate hydraulically actuatable means to actuate said store retaining means in said launching position and release a store carried thereby and to eject such released store.

4. An airborne stores launcher as defined in claim 1 wherein said carrier member encompasses an intermediate portion of said axle member.

5. An airborne stores launcher as defined in claim 1 wherein said ejector means includes a plurality of hydraulically actuatable means engageable with a store located in said launching position, and each of said plurality of said hydraulically actuated means being in part movable through a stroke to eject a store from said launching position.

6. An airborne stores launcher as defined in claim 5 wherein said ejector means includes means for varying said stroke of at least one of said hydraulically actuatable means.

7. An airborne stores launcher as defined in claim 5 wherein said ejector means includes means to vary the velocity of said part movable through said stroke.

8. In a stores launcher adapted for use in an aircraft and carrying a plurality of stores which selectively move into a launch position for sequential airborne launching thereof after selective release of retaining means cooperable with said stores, respectively, the improvement comprising: ejector means having a first portion cooperable only with the retaining means when an individual store is positioned in such launch position to release such positioned store and a second portion to eject such released store from the aircraft.

9. The improvement as defined in claim 8 wherein said ejector means is a hydraulic system.

10. The improvement as defined in claim 8 wherein said ejector means is a hydraulic system with said second portion including a plurality of extensible hydraulically actuatable devices.

11. The improvement as defined in claim 10 wherein said hydraulic system includes means operable to bias said plurality of extensible devices into engagement with a store located in the launch position.

12. The improvement as defined in claim 10 wherein said plurality of extensible devices is at least a pair of hydraulic cylinders each having a hydraulically extendable portion movable through a stroke.

13. The improvement as defined in claim 12 wherein said stroke of at least one of said cylinders is variable in length.

14. The improvement as defined in claim 12 wherein said stroke of at least one of said cylinders is variable in velocity.

* * * * *